Figures 1, 2:
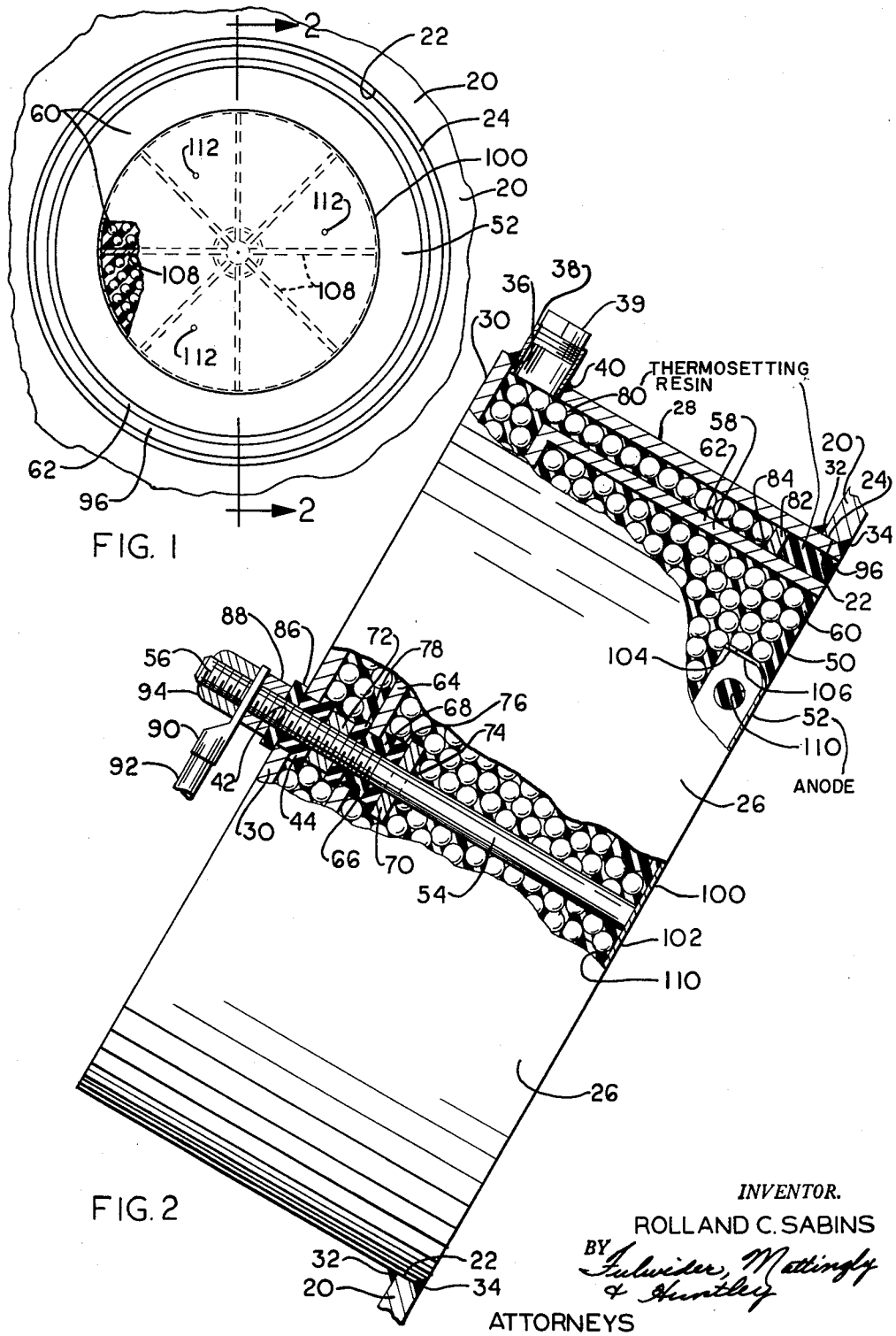

Dec. 4, 1962  R. C. SABINS  3,067,122
ANODE MOUNTING WITH CONCENTRIC BELLS
Filed March 19, 1959  2 Sheets-Sheet 1

INVENTOR.
ROLLAND C. SABINS
BY
ATTORNEYS

INVENTOR.
ROLLAND C. SABINS
BY *Fulwider, Mattingly & Huntley*
ATTORNEYS 3,067,122
ANODE MOUNTING WITH CONCENTRIC BELLS
Rolland C. Sabins, 522 Catalina Blvd., San Diego 6, Calif.
Filed Mar. 19, 1959, Ser. No. 800,499
17 Claims. (Cl. 204—196)

The present invention relates to the method of mounting an anode and to anode mountings. The present invention is particularly applicable to hulls of ships which are to be protected against dissolution of the metal of the hull and where anodes must be attached to inclined surfaces on the hulls.

In practicing the method, an opening is first formed in the metal to be protected, for example in the upwardly inclined wall of a ship's hull; an open ended housing of metal, whose ends bound the opening, is suitably secured, as by welding, to the hull, with the open end of the housing registering with the opening in the hull of the ship; an anode assembly is then placed into the housing through the opening in the housing; this anode assembly also includes a housing; it also includes an anode and a conductor connected wtih the anode; this housing of the anode assembly is also formed of metal; the conductor extends through a wall of the assembly and preferably the rear wall; the conductor and the anode are insulated from the assembly housing; the conductor also extends through a wall of the housing on the hull, and preferably through the rear wall of that housing, and it is insulated from the wall; the housing of the assembly is smaller in length and narrower in width than the inside of the housing on the hull so as to provide a space between the outer wall of the assembly housing and the inner wall of the housing on the hull; spacing means, preferably attached to the assembly side wall, holds the assembly wall in position relative to the housing on the hull; after the assembly is placed in position in the housing on the hull, glass spheres and then an insulating material is poured into the space between the housings to fill such space; this insulating material is a thermosetting synthetic resin of the type which flows a ambient temperaure and which hardens by thermosetting action.

The present invention also contemplates an anode assembly and mounting therefore of the type that can be used in the aforementioned method.

Further objects and advantages will be apparent from the following description, reference being had to the accompanying drawings wherein preferred embodiments of the invention are illustrated.

Figure 3:
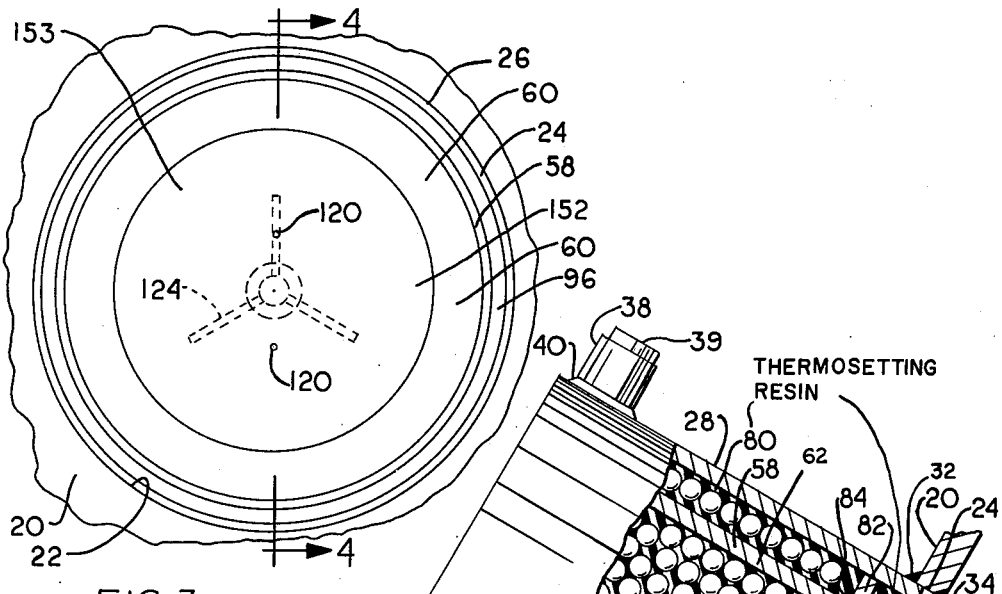
Figure 4:
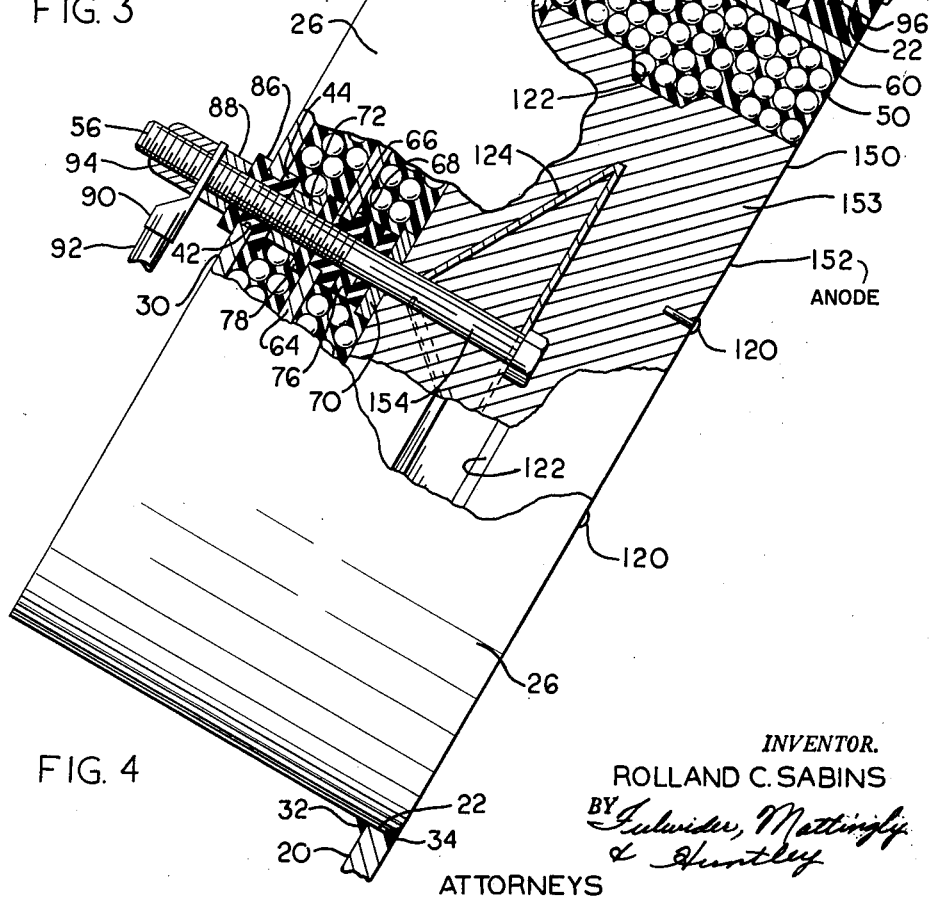

In the drawings:

FIG. 1 is a fragmentary view of the side of the steel hull of a ship showing one aspect of the present invention;

FIG. 2 is a sectional view taken on line 2—2 of FIG. 1 but on a larger scale and showing the hull wall at an angle which approximates the angular position at which the anode is mounted; parts of the insulating material and glass spheres have been omitted to more clearly show the shape of the anode plate; and FIGS. 3 and 4 are views similar to FIGS. 1 and 2 but showing another aspect of the present invention.

Referring more in detail to the drawings, a fragment of the steel wall of the hull of a ship is shown at 20. An opening 22 is cut into the wall 20 below the water line of the hull for receiving the end 24 of a metallic housing 26. This metallic housing is preferably cylindrical in shape, including a cylindrical side wall 28, having said end 24 and a base or rear wall 30. Obviously the opening 22 is also cylindrical. The open end of the housing 26 registers with the opening 22 in the hull. The housing 26 is suitably secured within the hull and to the wall 20 thereof as by welding on the interior as is indicated at 32, and at the exterior as at 34. The housing 26 is provided with an opening 36 at the uppermost part thereof for receiving a coupling 38, internally threaded to receive a pipe plug 39. This coupling is welded in place in opening 36, the weld being shown at 40. The central portion of the rear wall 30 of the housing 26 is provided with an opening 42 for receiving an insulating grommet 44 for the purpose hereinafter set forth.

The anode assembly 50 includes an anode 52 and a metallic conductor 54, which is preferably formed of bronze. This conductor 54 is welded or brazed to the anode 52 at one end and the other end is threaded as at 56. This anode and conductor are suitably encased in insulation except for the front surface of the anode and the rear end 56 of the conductor bolt 54. In the preferred embodiment the anode assembly includes a housing 58 and insulating material 60. The housing 58 itself may be formed of insulating material, but it is preferred to form the same of more sturdy material such as metal. This housing is preferably cylindrical in shape and includes a cylindrical side wall 62 and a base or rear wall 64.

This rear wall 64 is provided with a central opening 66 which receives a grommet 68. The conductor bolt 54 exends through htis grommet 68. The bolt 54 and the anode 52 are attached to the housing 58 prior to the application of the insulation 60. The bolt is held in position by a collar 70 and a nut 72. This collar 70 is suitably secured to the bolt 54 as by welding shown at 74. An insulating washer 76 is interposed between the rear side of the collar 70 and the front side of the insulating grommet 68. An insulating washer 78 is disposed between the rear side of the wall 64 and the nut 72. By drawing on the nut 72, the bolt 54 is attached to the rear wall 64 of the housing 58. Like grommet 42, the grommet 68 and the washers 78 and 76 are formed of suitable insulating material such as nylon.

The housing 58 is shorter than the inside depth of the hull housing 26 and has an outside diameter less than the inside diameter of the hull housing 26 so that when the assembly 50 is disposed within the housing 26 there is a space 80 provided between the side wall of the housings and the bottom wall of the housings. A spacer 82 is disposed between the housing wall 62 and the housing wall 28 of the housings 58 and 26 respectively. Preferably this spacer is in the form of a metallic ring and is preferably welded as at 84 to the cylindrical wall 52 of the housing 58 and thus forms part of the anode assembly.

The end 56 of the conductor bolt 54 exends through the grommet 44 carried by the rear wall 30 of the hull housing 26 and is secured to the rear wall 30 by the nut 72, grommet 44, nylon washer 86 and nut 88. The front of the grommet 44 abuts the rear of the nut 72 and the nylon washer 86 is interposed between the rear side of wall 30 and the front side of nut 88 whereby when the nut is drawn, the bolt 54 will be clamped to the rear wall 30 of housing 26. The terminal 90 of an insulated conductor 92 is secured to the threaded end 56 of conductor bolt 54 by a lock nut 94, the terminal 90 being perforated for receiving the end 56 and being disposed between the nut 88 and nut 94.

After the anode assembly 50 is placed in position wihtin the housing 26 a suitable cement putty 96 is trowelled in place filling the space forwardly of the spacer 82 and between the forward ends of the housings 26 and 58. This cement putty may be an epoxy-versamid cement mix. This cement putty seals the forward end of the space 80 at the spacer 82. Then a suitable insulating material is poured into the space 80, between the housings 26 and 58, through the pipe coupling 38. This insulating material may be an epoxy-versamid which flows at ambient temperature and which hardens by thermosetting action. The glass spheres or marbles prevent heat distortion of resin mass. The cement putty prevents leakage about the periphery of the ring 82. The space 80 is completely filled with the insulating material and pipe plug tightened into coupling 38, after hardening, provides a solid structure with the housing 26 and 58 and in fact with the entire assembly 50. The peripheral and forward edge of the spacer 82 is tack welded for electrical continuity to the outer housing 26 and the hull wall 20. Thus the housing 26 is also cathodically protected to prevent corrosion. It will be understood that the insulated conductor 92 is connected to the positive terminal of the A.C. to D.C. rectifier and must remain insulated from such parts as are exposed to the electrolytic action of the sea water. Too, it will be understood that the anode 52 is formed of such metal or is so constructed as to function as an inert anode, and that the conductor 92 is connected to the rectifier that is powered by an extraneous source of A.C. current. The negative of the rectifier is connected to the ship's hull as is understood by those skilled in the art.

In the embodiment shown in FIGS. 1 and 2, the anode 52 includes a plate 100 formed for example of tantalum or titanium having plated thereon platinum. This plate 100 includes a flat base 102 and cylindrical side 104 which extends inwardly. This side is provided with a series of holes 106 and the insulating material 60 extends through these holes for locking the plate in position in the insulation. The forward end of the conductor bolt 54 is brazed or welded to the inside surface of the base 102 and a series of webs 108 are secured to the inner surface of the sides 104 and to the conductor bolt 54. These webs form trusses for reinforcing the anode. These trusses are also provided with a series of holes 110 through which the insulation 60 extends for assisting in holding the plate 100 in position.

It will be understood that after the anode and conductor rod are suitably attached to the housing 58, the housing is placed so that the bottom rests on a horizontal plane and then the epoxy-versamid is poured in position, encasing the plate 100 except for the exposed front surface 102. After this insulation hardens, the anode and conductor rod 54 are held sturdily in position.

The base 102 of the plate is provided with a plurality of vent holes 112 which permit the escape of air from underneath the plate while the hot insulating material, in liquid form, is poured into the housing 58.

In the aspect of the invention shown in FIGS. 3 and 4, the anode assembly 150 comprises an anode 152. This anode includes a large mass of relatively inexpensive material such as lead 153 and it includes a plurality of platinum studs 120, the outer edges of which are exposed to the electrolyte or sea water. This anode is of the type as described in my co-pending application Serial No. 715,440, filed February 14, 1958. This anode is preferably cylindrical in shape having an irregular portion which cooperates with the insulation 60 to provide a lock for assisting in locking the mass in position. This irregular portion may take any desired form, but it is herein shown as a groove 122 which, after being filled with insulation, which has hardened, assists in locking the mass in position.

In this aspect of the invention, the conductor bolt 154 terminates within the cast lead mass 153, i.e., the lead is cast about the bolt and about a plurality of conductor core rods 124. These core rods are V-shaped with their ends brazed or welded to the conductor bolt 154.

From the foregoing it will be seen that I have provided anodes which will not become detached by the beatings they receive when subjected to the environments of the sea such as the surging of the water. Air or water cannot enter behind the anode and therefore there are no pulsating pressures in back of the anode. In the instant invention, the backs of the anodes are completely encased by a hardened insulation which does not permit the penetration of air or water.

Also it is apparent that I have provided a new and novel method of installing an anode assembly. By first providing an inwardly extending housing 26, attached to the hull and in sealing relationship therewith, insulation in the liquid state can be poured into the housing to completely surround the inner housing 58 including the area above the inner housing. It will be understood that as the insulation in the fluid state is being poured through the coupling 38 into the space 80, air, from the space 80, will bubble upwardly through the insulation passing through the coupling 38. In this manner the entire area surrounding the anode assembly 50 or 150, including the area above the anode, can be filled with plastic, which thereafter hardens to form with the anode assembly a sturdy, practically indestructible anode assembly. Preferably glass marbles are contained within the insulation as it is being poured into the space 80 for the purpose of reducing shrinkage and increasing strength, that is, in addition to increasing strength, the glass marbles take up the heat which is generated when the insulation cools to prevent shrinkage of the insulation.

While the forms of embodiment herein shown and described constitute preferred forms, it is to be understood that other forms may be adopted falling within the scope of the claims that follow.

I claim:
1. In combination, a ship hull having an opening below the water line; an anode assembly including a metal housing having walls, an electrical conductor having a portion extending outwardly from the housing and a portion extending through a wall of and into the housing, an anode connected with the latter portion of said conductor, insulating material between the anode and housing and between the conductor and housing; a second metal housing having an open end, said second housing extending into the hull, the material of the second housing at the open end being secured to the hull, said assembly being disposed in the second mentioned housing with the anode exposed to the water in which the hull floats, said conductor of the assembly extending through a wall of the second mentioned housing and into the hull; insulating material between the conductor and the second mentioned housing; and insulating material interposed between the housings and surrounding that portion of the conductor which is disposed between the housings.

2. An anode mounting as in claim 1, wherein the housings are spaced from one another and spacing means is carried by one of the housings for circumferentially spacing said housings.

3. An anode mounting as in claim 1, wherein the housings are substantially concentric and spacing means surrounds the first mentioned housing within the confines of the second mentioned housing.

4. An anode mounting as in claim 1, wherein the housings include substantially concentric cylindrically shaped walls and spacing means surrounds the first mentioned housing within the confines of the second mentioned housing.

5. An anode mounting as in claim 1, wherein the housings are substantially concentric and spacing means surrounds the first mentioned housing within the confines of the second mentioned housing, said spacing means comprising a solid ring completely spanning the space between the housings.

6. An anode mounting as in claim 1, wherein the housings include substantially concentric cylindrically shaped walls and spacing means surrounds the first mentioned housing within the confines of the second mentioned housing, said spacing means comprising a solid ring completely spanning the space between the housings.

7. An anode mounting as in claim 1, wherein the second mentioned housing is provided with an opening at substantially the highest part thereof for receiving insulating material.

8. An anode mounting as in claim 1, wherein a grommet is disposed between the conductor and second mentioned housing.

9. An anode mounting as in claim 1, wherein the anode is a plate embedded in the first mentioned insulation and having a surface exposed to the water in which the hull floats.

10. An anode mounting as in claim 1, wherein the anode is a plate embedded in the first mentioned insulation and having a surface exposed to the water in which the hull floats, the outer surfaces of said plate and first mentioned insulation lying substantially flush with the outer surface of the hull.

11. An anode mounting as in claim 1, wherein the anode is a plate embedded in the first mentioned insulation and having a surface exposed to the water in which the hull floats, and having a vent.

12. An anode mounting as in claim 1, wherein the anode is a plate embedded in the first mentioned insulation and having a surface exposed to the water in which the hull floats, the side wall of the plate having at least one opening therethrough.

13. An anode mounting as in claim 1, wherein the anode is a plate embedded in the first mentioned insulation and having a surface exposed to the water in which the hull floats, the outer surfaces of said plate and first mentioned insulation lying substantially flush with the outer surface of the hull, the side wall of the plate having at least one opening therethrough.

14. An anode mounting as defined in claim 1, wherein the anode comprises a casting of metal and the conductor being embedded in said casting.

15. An anode mounting as defined in claim 1, wherein the anode comprises a casting of metal and the conductor being embedded in said casting, the outer surface of the casting, confronting the inner surface of the first mentioned housing, being irregular.

16. An anode mounting as defined in claim 1, wherein the anode comprises a casting of metal and the conductor being embedded in said casting, the outer surface of the casting, confronting the inner surface of the first mentioned housing, being indented.

17. An anode mounting as defined in claim 1, wherein the anode comprises a casting of metal and the conductor being embedded in said casting, the outer surface of the casting, confronting the inner surface of the first mentioned housing, having a circumferential groove.

References Cited in the file of this patent

UNITED STATES PATENTS

| | | |
|---|---|---|
| 1,900,011 | Durham | Mar. 7, 1933 |
| 2,721,172 | Higgons et al. | Oct. 18, 1955 |
| 2,776,940 | Oliver | Jan. 8, 1957 |
| 2,776,941 | Wagner | Jan. 8, 1957 |
| 2,805,987 | Thorne et al. | Sept. 10, 1957 |
| 2,878,173 | Oberman | Mar. 17, 1959 |
| 2,934,485 | Sabins | Apr. 26, 1960 |

FOREIGN PATENTS

| | | |
|---|---|---|
| 614,799 | Great Britain | Dec. 22, 1948 |